United States Patent
Motoyama et al.

(10) Patent No.: US 6,980,750 B2
(45) Date of Patent: Dec. 27, 2005

(54) COLOR IMAGE FORMING APPARATUS WITH MONOCHROME/COLOR DISCRIMINATING FUNCTION

(75) Inventors: Eiichi Motoyama, Tokyo (JP); Takashi Fujimori, Ibaraki (JP); Hideyuki Ikegami, Chiba (JP); Satoru Yamamoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 10/410,345

(22) Filed: Apr. 10, 2003

(65) Prior Publication Data

US 2003/0194247 A1 Oct. 16, 2003

(30) Foreign Application Priority Data

Apr. 11, 2002 (JP) .......................... 2002-108634

(51) Int. Cl.[7] .............................................. G03G 15/00
(52) U.S. Cl. ........................................... 399/85; 399/82
(58) Field of Search ............................ 399/75, 82, 85; 358/443, 448

(56) References Cited

U.S. PATENT DOCUMENTS

| | | | |
|---|---|---|---|
| 5,734,758 A | * | 3/1998 | Yamamoto et al. ..... 358/448 X |
| 5,786,906 A | | 7/1998 | Shishizuka .................. 358/500 |
| 5,884,120 A | * | 3/1999 | Ito et al. .................... 399/85 X |
| 6,029,023 A | * | 2/2000 | Munemori et al. ....... 399/82 X |
| 6,192,207 B1 | * | 2/2001 | Yamamoto et al. ........... 399/82 |

* cited by examiner

Primary Examiner—Sandra L. Brase
(74) Attorney, Agent, or Firm—Fitzpatrick, Cella, Harper & Scinto

(57) ABSTRACT

A color image forming apparatus including image forming portions for respective color components of yellow, magenta, cyan, and black. It can be set whether a discriminating function of discriminating whether an original image is a color image or a monochromatic image is used. If the use of the discriminating function is set, a preparatory operation of forming the image in a full-color recording mode is performed before obtaining a result of the discrimination. When the result of the discrimination is monochrome, the image formation in a monochrome recording mode is executed after a shift from the full-color recording mode to the monochrome recording mode. If configured to perform the preparatory operation of forming the image in the monochrome recording mode before obtaining the result of the discrimination, when the result of the discrimination is color, the image formation in the full-color recording mode is executed after a shift from the monochrome recording mode to the full-color recording mode.

14 Claims, 13 Drawing Sheets

COLOR IMAGE FORMING APPARATUS WITH MONOCHROME/COLOR DISCRIMINATING FUNCTION

BACKGROUND OF THE INVENTION

1. Field of the Invention

The present invention relates to a switchover of recording modes in an image recording apparatus having a monochrome image recording mode and a color image recording mode.

2. Description of Related Art

FIG. 18 is a block diagram showing a typical configuration of an image recording apparatus.

Referring to FIG. 18, reference numeral 4001 denotes a scanner portion for outputting readout image data of an original image. Reference numeral 4004 denotes a network portion for inputting the image data from an external device via a local area network (LAN) etc. Reference numeral 4002 stands for an image control portion for effecting predetermined processing on the image data inputted from the scanner portion 4001 or the network portion 4004 and outputting the processed image data. Reference numeral 4003 denotes a printer portion for recording the image data given from the image control portion 4002 on a storage medium. An operation portion denoted by 4005 includes a variety of keys, a display portion, a touch panel, etc. and is capable of making a variety of settings of the image recording apparatus and giving an instruction of the operation thereof.

Further, the image control portion 4002 has an auto color discriminating function for discriminating whether the image data inputted are defined as a monochrome image or a color image. This auto color discriminating function involves the use of a known technology disclosed in U.S. Pat. No. 5,786,906 B etc. Moreover, a user is able to indicate through the operation portion 4005 whether the auto color discriminating function is used or not. Further, if indicated not to use the auto color discriminating function through the operation portion 4005, the user is able to give from the operation portion 4005 an indication of selecting an operation in a monochrome image recording mode or in a color image recording mode.

The following discussion on an outline of an image forming operation procedure in the image recording apparatus shown in FIG. 18, will be made referring to FIGS. 19 and 20 separately in a case of using and in a case where the auto color discriminating function.

Firstly, the case of using the auto color discriminating function will be explained referring to FIG. 19.

FIG. 19 is a diagram showing the outline of the image forming operation procedure in the case of using the auto color discriminating function in the image recording apparatus shown in FIG. 18.

As shown in FIG. 19, at first, the image control portion 4002 inputs an image from the scanner portion 4001, and executes a color discrimination (a color identification) based on the auto color discriminating function described above.

Next, the image control portion 4002 sends, based on a result of the color discrimination, a color mode designation and a print preparation instruction to the printer portion 4003.

Subsequently, the printer portion 4003, when receiving the print preparation instruction from the image control portion 4002, performs the print preparation operation in correspondence to a designated color mode, and notifies the image control portion 4002 of a completion of the print preparation.

Ensuingly, the image control portion 4002, upon receiving the notification of the completion of the print preparation from the printer portion 4003, indicates the printer portion 4003 to start printing, and outputs the images in accordance with a predetermined procedure.

The printer portion 4003 indicated to start printing effects printing based on image signals outputted from the image control portion 4002.

Secondly, an image forming operation procedure in the case where the auto color discriminating function is not used will be explained with reference to FIG. 20.

FIG. 20 is a diagram showing an outline of an image forming operation procedure in the case where the auto color discriminating function in the image recording apparatus shown in FIG. 18 is not used.

As shown in FIG. 20, the image control portion 4002 inputs the image from the scanner portion 4001 and sends to the printer portion 4003 a color mode designated and a print preparation instruction through the operation portion 4005.

Next, the printer portion 4003, when receiving the color mode and the printer preparation instruction from the image control portion 4002, performs the print preparation operation in correspondence to the designated color mode, and notifies the image control portion 4002 of a completion of the print preparation.

Subsequently, the image control portion 4002 indicates, the image input being completed, the printer portion 4003 to start printing upon a receipt of the completion of the print preparation from the printer portion 4003, and outputs the image in accordance with a predetermined procedure.

The printer portion 4003 indicated to start printing effects printing based on image signals outputted from the image control portion 4002.

According to the image forming operation procedure in the prior art, however, the printer portion 4003 makes the print preparation based on the color mode designation, and hence the image control portion 4002 is required to wait till the print preparation is completed after inputting the image and making the color discrimination. Therefore, there is a problem in that it takes a considerable time till the first print operation is completed.

Further, in a case where a single sheet or plural sheets of color image prints and a single or plural sheets of monochrome image prints are alternately outputted, the color image recording mode and the monochrome image recording mode are frequently switched over, with the result that a lifetime of the apparatus might be reduced. Moreover, the mode switching operation is time-consuming, resulting in a decrease in throughput of the image formation.

In addition, the time up till the first print operation is completed differs depending on the case of using the auto color discriminating function and the non-use case. Usually, when the user who selects the color image recording mode utilizes the auto color discriminating function, the time up till the first sheet is printed out is longer than in the case of setting the color image recording mode, and consequently there arises a problem of causing an irritated feeling of the user, making the user anxious about a fault, etc.

SUMMARY OF THE INVENTION

It is an object of the present invention to provide a color image recording apparatus and a control method thereof, which are capable of eliminating the inconveniences described above.

It is another object of the present invention to provide a user-friendly color image recording apparatus and a control method thereof, which are capable of making compatible a life time of the apparatus that is affected by a color mode switching operation and an increase in time required for printing at a proper balance.

It is further another object of the present invention to provide a color image recording apparatus and a control method thereof, which are capable of efficiently executing a printing process for a mixture of a monochrome image page and a color image page in the case of utilizing an auto color discriminating function.

Other objects of the present invention will become apparent from the following discussion in conjunction with the accompanying drawings and from the claims.

DESCRIPTION OF THE PREFERRED EMBODIMENTS

[First Embodiment]

A color image recording apparatus in a first embodiment of the present invention is constructed of a printer portion (FIG. 2), a scanner portion (FIG. 3), an image control portion (FIG. 4), a network portion 4000, and an operation portion 3500, which will hereinafter be explained.

Figure 1:
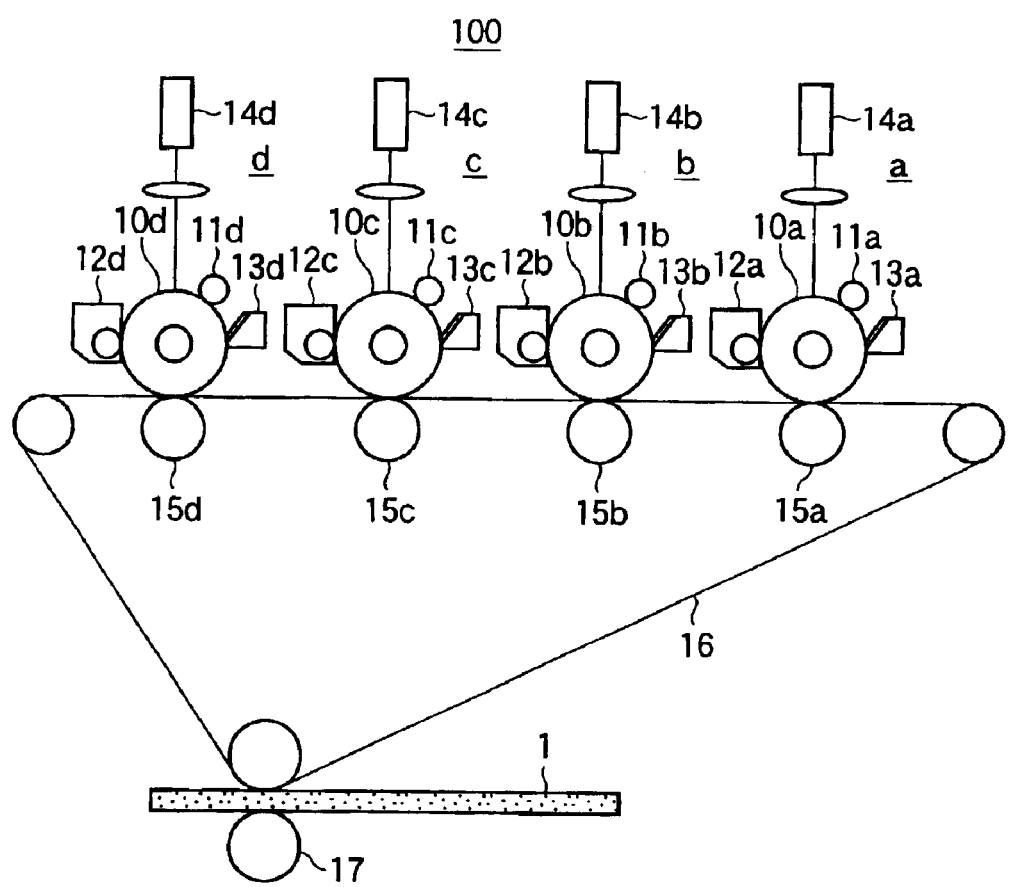
FIG. 1 is a sectional view showing a configuration of principal components of a printer portion in a color image recording apparatus.

FIG. 1 is a sectional view showing a configuration of principal components of the printer portion in the color image forming apparatus.

Referring to FIG. 1, reference numeral 100 denotes an image forming portion constructed of four pieces of image forming portions "a", "b", "c", and "d", primary transfer rollers 15 (four pieces of primary transfer rollers 15a, 15b, 15c, and 15d), an intermediate transfer belt 16, and secondary transfer rollers 17. Note that a scanner portion 4001 is provided on an upper part of the image recording apparatus.

The following is an explanation in greater detail of each individual unit.

Each of the image forming portions "a", "b", "c", and "d" has a configuration that will be described as below.

A photosensitive drum 10 (10a, 10b, 10c, 10d) serving as an image bearing member is axially supported at its center and rotationally driven. An charging roller 11 (11a, 11b, 11c, 11d), an optical system 14 (14a, 14b, 14c, 14d), and a developing device 12 (12a, 12b, 12c, 12d) are disposed in a rotational direction thereof so as to face an outer peripheral surface of the photosensitive drum 10.

A latent image forming process in the image forming portion 100 will hereinafter be explained.

First, the charging roller 11 applies an electric charge with a uniform charging amount to the surface of the photosensitive drum 10. Subsequently, the optical system 14 causes the photosensitive drum 10 to be exposed to light beams such as laser beams modulated in correspondence to an image signal, thereby forming an electrostatic latent image on the photosensitive drum 10.

Further, the electrostatic latent image on the photosensitive drum 10 is visualized by the developing device 12 accommodating developers (toners) in four colors such as yellow, cyan, magenta, and black. Through the process described above, the images are sequentially formed by use of the respective toners. Note that a cleaning device 13 (13a, 13b, 13c, 13d) cleans the drum surface by scraping off the toners that are not transferred onto the sheet but left as residual toners on the photosensitive drum on a downstream side of an image transfer area where the visible image visualized is transferred onto an intermediate transfer member.

Moreover, the primary transfer rollers 15a through 15d are disposed on the back side of the intermediate transfer belt 16 in a primary transfer area where each photosensitive drum 10 faces the intermediate transfer belt 16. Further, the secondary transfer rollers 17 are pressurized by a proper pressure against the intermediate transfer member and form a secondary transfer area in cooperation with a nip with the intermediate transfer belt 16.

The discussion will be given along with an operation of the apparatus.

When an image forming operation start signal is transmitted, sheets 1 are fed one by one out of an unillustrated sheet feeding cassette. Then, the sheet is conveyed at such a timing that a leading edge of the toner image primarily transferred onto the intermediate transfer belt 16 by the image forming portion 100 becomes coincident exactly with a leading edge of the sheet 1 in the secondary transfer area.

On the other hand, in the image forming portion 100, upon the transmission of the image forming operation start signal, the toner image formed on the photosensitive drum 10d positioned in the most upstream side is, through the process described above, primarily transferred onto the intermediate transfer belt 16 by the primary transfer roller 15d to which a high voltage has been applied. The thus primarily transferred toner image is conveyed up to the next primary transfer roller 15c.

The image forming portion "c" performs an image formation with a delay corresponding to a time for which the toner image is conveyed between the respective image forming portions. The toner image formed on the photosensitive drum 10c is transferred so as to set a registration just on the conveyed toner image. The same process is repeated hereafter, and eventually the toner images assuming four colors are primarily transferred onto the intermediate transfer belt 16.

Thereafter, when the sheet 1 enters the secondary transfer area and is brought into contact with the intermediate transfer belt 16, the high voltage is applied to the secondary transfer rollers 17 in accordance with a passage timing of the sheet 1. Then, the four-colored toner images formed on the intermediate transfer belt 16 are transferred onto the surface of the sheet 1. Thereafter, the toner images transferred onto the sheet 1 are fixed onto the sheet by the heat of unillustrated fixing rollers and by a pressure of the nip of the fixing rollers. Subsequently, the sheet 1 is discharged outside the machine.

Figure 2:
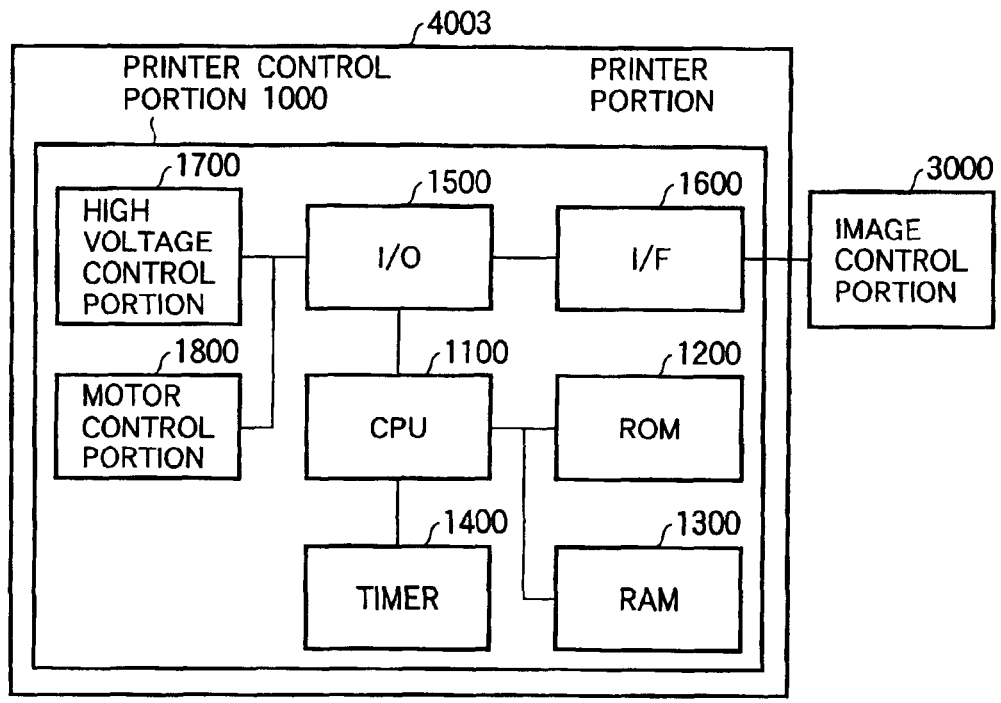
FIG. 2 is an explanatory block diagram showing a configuration of a printer control portion in the color image recording apparatus.

FIG. 2 is an explanatory block diagram showing a configuration of the printer control portion 1000 in the image recording apparatus of the present invention.

Referring to FIG. 2, reference numeral 1100 denotes a CPU that controls an operation of a printer portion 4003. A ROM 1200 stored with a control program, a work RAM 1300 for executing processes, and an I/O port 1500 are connected to the CPU 1100 via an address bus and a data bus.

Further, a timer 1400 is connected to the CPU 1100 in order to execute a variety of timing control operations, so that a time measuring operation can be done. Components connected to the I/O port 1500 include a high voltage control portion 1700 for controlling the voltage applied to the image forming portion 100 within the printer portion 4003 and a motor control portion 1800 for controlling unillustrated motor, clutch, sensor, etc.

Moreover, an I/F portion 1600 for sending and receiving data to and from an image control portion 3000 that will be explained later on, is connected to the I/O port 1500, thereby sending and receiving control signals and image data. The CPU 1100 controls, based on the control program stored on the ROM 1200, inputs and outputs at a predetermined timing via the I/O port 1500, and executes the image forming operation.

Figure 3:
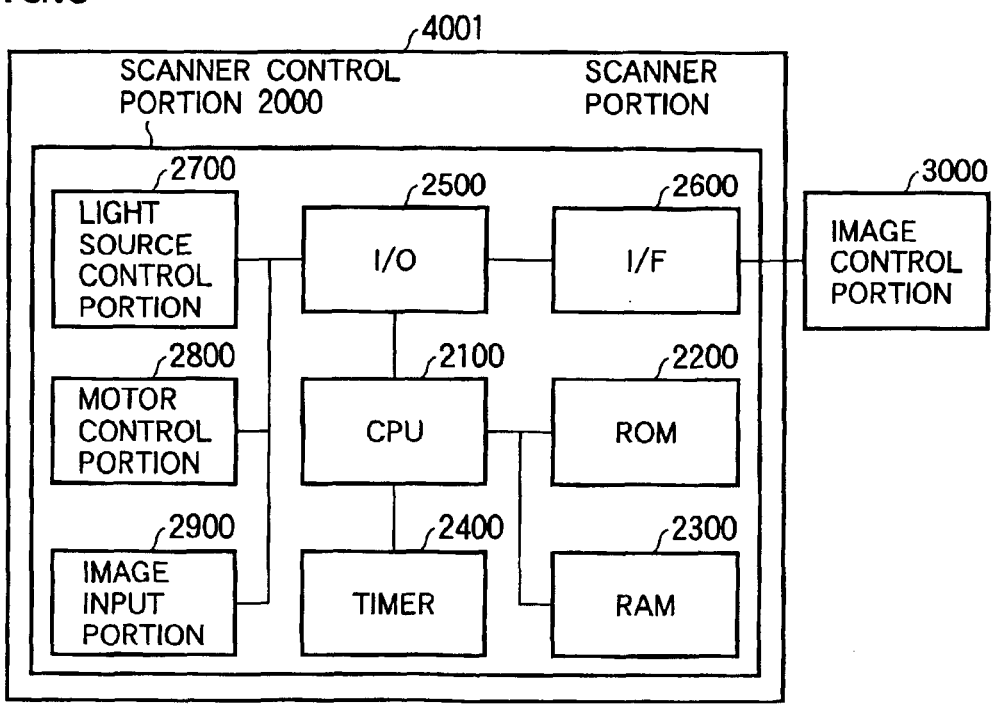
FIG. 3 is an explanatory block diagram showing a scanner control portion in the color image recording apparatus.

FIG. 3 is an explanatory block diagram showing a configuration of a scanner control portion 2000 in the color image recording apparatus in one embodiment of the present invention.

Referring to FIG. 3, reference numeral 2100 denotes a CPU performing basic control of a scanner portion 4001. A ROM 2200 stored with a control program, a work RAM 2300 for executing processes, and a timer 2400 for conducting various timing control operations, are connected to the CPU 2100. The main configuration is the same as that of the printer control portion 1000, and its detailed description is omitted.

Reference numeral 2500 denotes an I/O port. Components connected to the I/O port 2500 include a light source control portion 2700 for illuminating an original placed on a scanner with the light, a motor control portion 2800 for controlling a motor, a sensor, etc. which are not illustrated herein, and an image input portion 2900 for taking in original image information converted into electric data by a unillustrated CCD, as digital data through an A/D converter. Further, an I/F 2600 for sending and receiving the data to and from an image control portion 300 that will be explained later on, is connected to the I/O port 2500, thereby sending and receiving control signals and image data.

Figure 4:
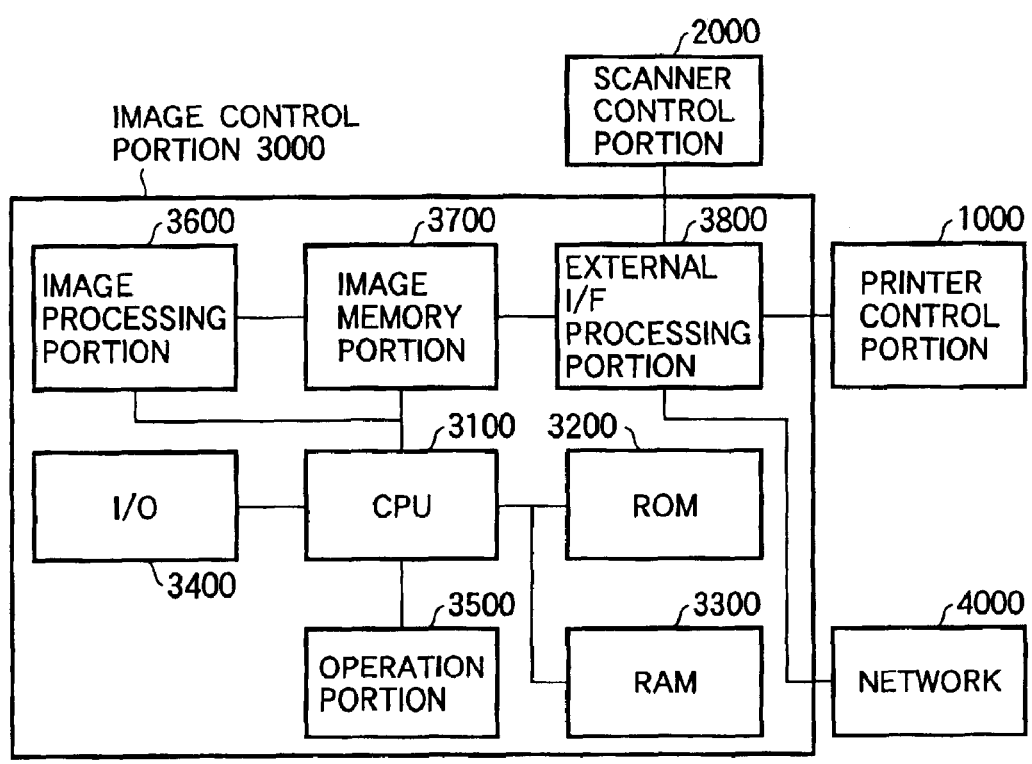
FIG. 4 is an explanatory block diagram showing a printer control portion in the color image recording apparatus.

FIG. 4 is an explanatory block diagram of the image control portion 3000 in the color image recording apparatus in one embodiment of the present invention.

Referring to FIG. 4, reference numeral 3100 denotes a CPU that executes basic control of image processing. A ROM 3200 stored with a control program, a work RAM 3300 for executing processes, and an I/O port 3400 are connected to the CPU 3100 via an address bus and a data bus. An operation portion 3500 for displaying a state of the color image recording apparatus is further connected to the CPU 3100.

Further components connected to this CPU 3100 include an image processing portion 3600 for executing a process for signals converted into the electric signals by the scanner control portion 2000 and an image memory portion 3700 for accumulating the image data processed by the image processing portion 3600.

Reference numeral 3800 denotes an external I/F processing portion for controlling inputs and outputs of the data among the printer control portion 1000, the scanner control portion 2000, a network 4000, and external devices. The external I/F processing portion 3800 executes processes including outputting the image data accumulated on the image memory portion 3700 to the printer control portion 1000, inputting the image data read through the scanner control portion 2000 to the image memory portion 3700, and inputting PDL data given from external clients connected to the network 4000 to the image memory portion 3700.

The printer control portion 1000, the scanner control portion 2000, and the image control portion 3000 shown in FIGS. 2 through 4 are, as described above, capable of the independent control by performing the communications with each other via the I/F portion provided in each of these portions.

Further, the image control portion 3000 has an auto color discriminating (Auto Color Select (ACS)) function of automatically discriminating whether the image assumes a color or monochrome by analyzing, in the image control portion 3000, the color components of the original image data read by the scanner portion 4001 and outputted from the scanner control portion 2000 or of the image data inputted via the network 4000, and a substance of this ACS is an auto color discriminating process by the CPU 3100.

Moreover, an instruction from the operation portion 3500 or an instruction from a device linked to the network 4000 enables a selection of color printing, or monochromatic printing or the auto color discriminating function described above.

Figure 5:
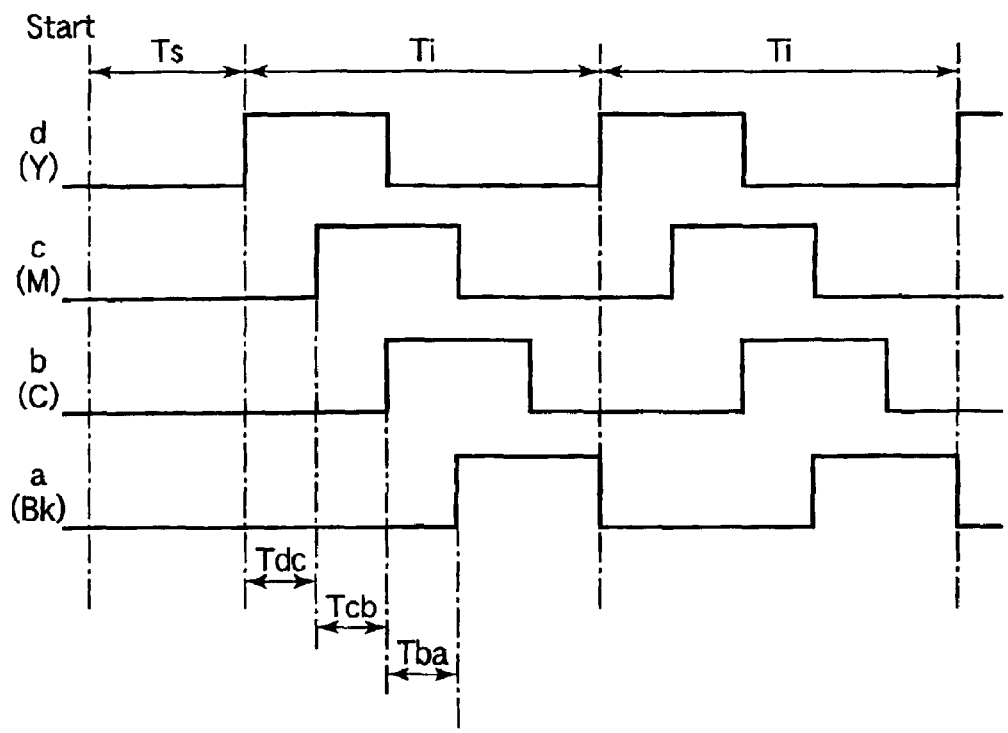
FIG. 5 is a timing chart showing image forming timings in the case of forming an image in full colors.

FIG. 5 is a timing chart showing image forming timings in the case of forming images in full colors by use of the toners for the four colors of yellow (Y), magenta (M), cyan (C), and black (Bk) in the image recording apparatus of the present invention.

Referring to FIG. 5, symbols "a", "b", "c", and "d" indicate the operation timings of the image forming portions for the respective colors, and respectively correspond to development timings in the developing devices for black (Bk), cyan (C), magenta (M), and yellow (Y).

A time Ts is a time till a first image formation is started in the image forming portion for yellow (Y) disposed in the most upstream side on a conveying route since the operation has been started. A time Tdc is a time till the operation of the image forming portion for magenta (M) is started since the operation of the image forming portion for yellow (Y) has been started. A time Tcb is a time till the operation of the image forming portion for cyan (C) is started since the operation of the image forming portion for magenta (M) has been started. A time Tba is a time till the operation of the image forming portion for black (Bk) is started since the operation of the image forming portion for cyan (C) has been started. A time Ti is a time necessary for forming the image per recording sheet.

Thus, in the case of the full colors, the images are sequentially formed in the order of yellow (Y), magenta (M), cyan (C), and black (Bk).

Next, a case of forming only the black image will be explained with reference to a timing chart in FIG. 6.

Figure 6:
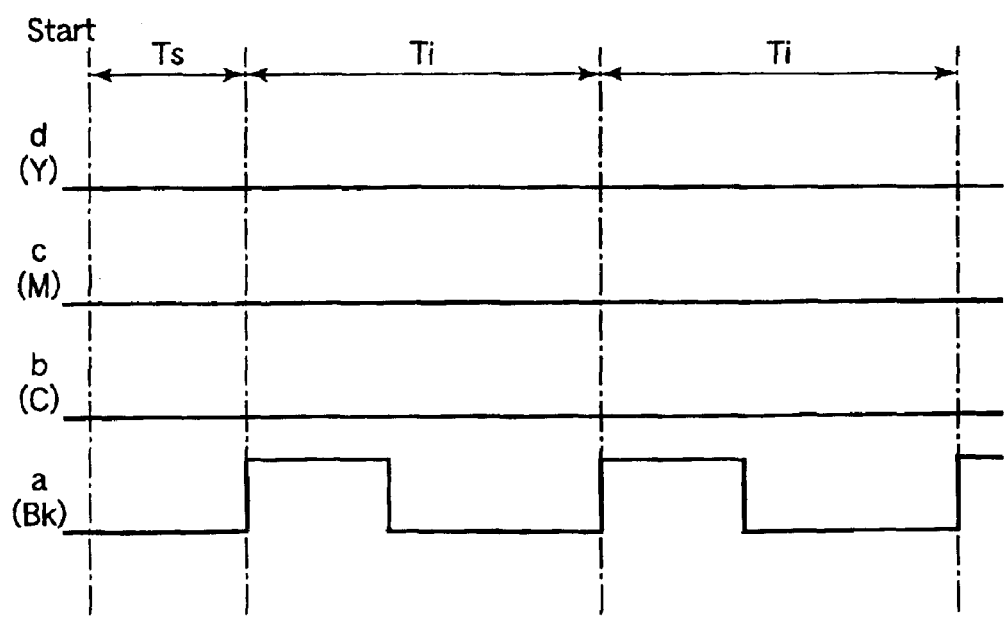
FIG. 6 is a timing chart showing image forming timings in the case of forming a monochrome image.

FIG. 6 is the timing chart showing an image formation timing in the case of forming the image in one color (black (Bk)) in the image recording apparatus of the present invention. The same components as those in FIG. 5 are denoted by the same symbols.

As shown in FIG. 6, only the black image is formed, and hence the image forming portion for black starts operation after an elapse of the time Ts.

Note that the interval time Ti may be, if possible, set shorter than in the case shown in FIG. 5.

An operation when printing the original image read by the scanner portion 4001 or the image inputted via the network 4000 in the image forming procedure described above, will hereinafter be explained referring to FIGS. 7 and 8.

Figure 7:
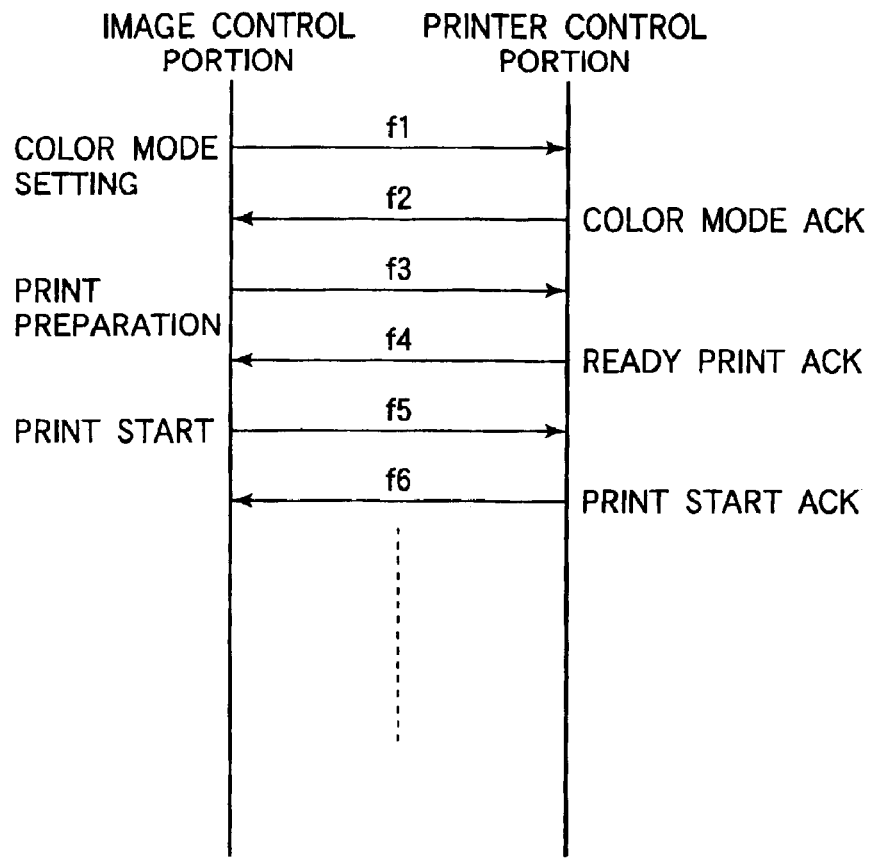
FIG. 7 is a schematic diagram showing a content of communications between the image control portion and the printer control portion up to a start of printing operation.

FIG. 7 is a schematic diagram showing contents of communications between the image control portion 3000 and the printer control portion 1000 up to the start of the printing operation in the image recording apparatus of the present invention.

As shown in FIG. 7, to begin with, when any one of the color print and the monochrome print is selected through the operation portion 3500, the selected color mode is sent to the printer control portion 1000 from the image control portion 3000. On the other hand, when the auto color select (ACS) function is selected through the operation portion 3500, an ACS mode as a color mode is sent to the printer control portion 1000 from the image control portion 3000 (f1).

Next, the printer control portion 1000 acknowledges a receipt of the color mode setting and sends a color mode ACK back to the image control portion 3000 (f2).

Subsequently, the image control portion 3000 sends an instruction of a print preparation to the printer control portion 1000 (f3). The printer control portion 1000, when receiving a print preparation instruction signal, makes a preparation for an electrophotographic process to enable the print operation to be executed any time, and sends back a ready-print ACK showing that the print preparation has been made (f4).

The image control portion 3000 next sends an instruction of a print start to the printer control portion 1000 (f5). The printer control portion 1000, when receiving a print start instruction signal, sends back a start-print ACK showing that the printing is to be started (f6), and starts the printing operation.

Note that the color mode setting (f1) may be sent, not through the individual communication described above, but as a parameter of the print preparation (f3), to the printer control portion 1000, and in this case the color mode ACK (f2) is not sent back.

Figure 8:
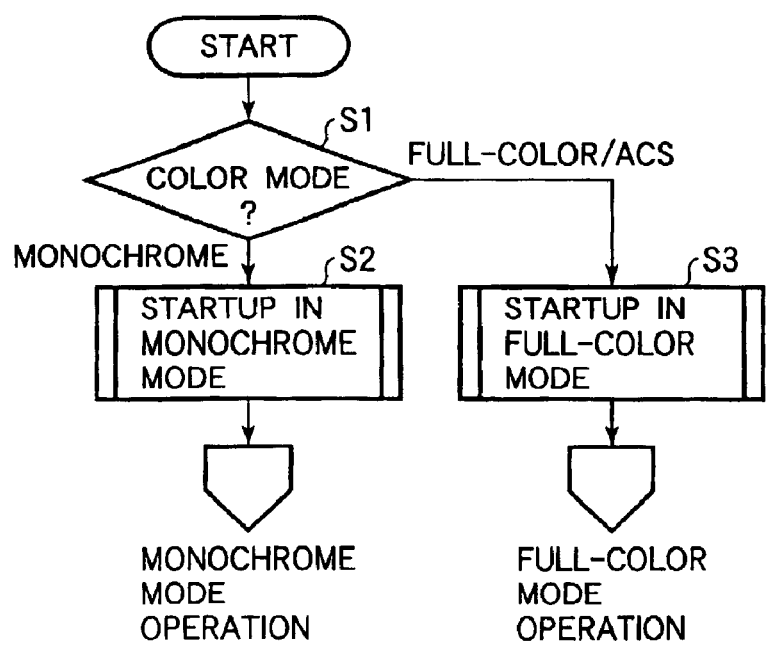
FIG. 8 is a flowchart showing one example of a first control processing procedure.

FIG. 8 is a flowchart showing one example of a first control processing procedure in the image recording apparatus of the present invention. This example corresponds to an operation of the printer control portion 1000 in the case of performing the communications in the procedure shown in FIG. 7. Note that processes in this flowchart are to be executed by the CPU 1100 shown in FIG. 2 on the basis of the program stored on the ROM 1200. Further, symbols S1 through S3 denote respective steps.

At first, the image control portion 3000, when the color mode setting (f1) is done, judges which mode, the full-color mode, the ACS mode, or the monochrome mode, this color mode comes under (step S1). If the color mode is judged to be the monochrome mode in step S1, the preparatory operation in the monochrome mode is made by the printer control portion 1000 based on the print preparation notification (f3) given from the image control portion 3000 (step S2), and an image formation in the monochrome mode is started upon receiving the print start notification (f5) given from the image control portion 3000.

On the other hand, if it is judged in step S1 that the color mode is the full-color mode or the ACS mode, the preparatory operation in the full-color mode is made by the printer control portion 1000 based on the print preparation notification (f3) given from the image control portion 3000 (step S3). Upon receiving the print start notification (f5) given from the image control portion 3000, an image formation in the full-color mode is started.

Note that the color image recording apparatus in the first embodiment does, as described above, the preparatory operation in the full-color mode when in the ACS mode operation and, even if judged to be monochrome as a result of the ACS discrimination, forms the monochrome image as the mode remains to be the full-color mode. In this case, the image control portion 3000 is to output, based on the result of discriminating between the colors, the print image to the printer portion by controlling the image processing of the image processing portion 3600 such that an image density of each of the color components (yellow (Y), magenta (M), and cyan(C)) other than black (Bk) is set to [0] (that is a value indicating non-recording by the printer portion, i.e., a density indicating non-formation of the electrostatic latent image on the drum).

Further, the discussion in the flowchart shown in FIG. 8 is concerned with the case of performing the preparatory operation in the full-color mode when in the ACS mode operation and, even if judged to be monochrome as the result of the ACS discrimination, executing the monochrome print operation as the mode remains to be the full-color mode (in this case, the monochrome image is assured by the image data inputted to the printer portion). If judged to be monochrome as the result of the ACS discrimination, there may be taken a scheme of shifting to the monochrome mode. This scheme also enables a consecutive shift to the image forming operation irrespective of whichever the result of the ACS discrimination may be.

Figure 9:
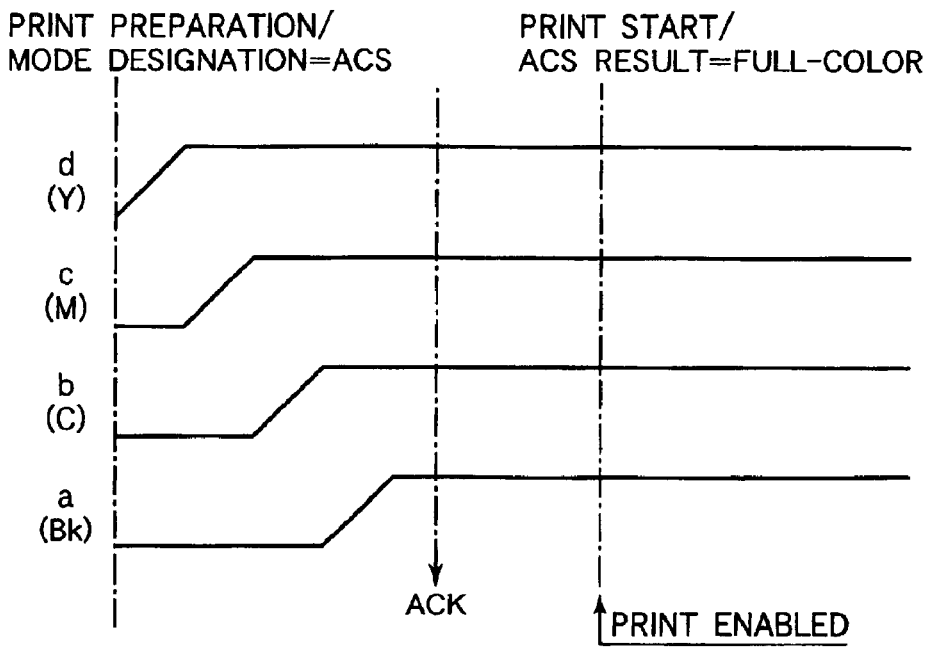
FIG. 9 is a timing chart showing the operation timings when a result of auto color discrimination is a full-color mode.

In this scheme, if the color mode is the full-color mode and if the result of the ACS discrimination is the full-colors, the image forming portion makes the preparatory operations (such as starting up at a high voltage as in the case of charging, developing and so on) at the respective timings shown in the timing chart in FIG. 9. At first, the ACS mode being designated, the preparatory operations of the four image forming portions "a", "b", "c", and "d" are sequentially started, and, when the preparations have been completed, ACK is sent back to the image control portion 3000 from the printer control portion 1000. Then, the image control portion 3000 notifies the printer control portion 1000 of the full-color mode in a print start notification. In this case, there is no necessity of making the print preparation once again because of preparing in the full-color mode, and it comes to a print enabled state simultaneously when notified of the full-color mode.

Figure 10:
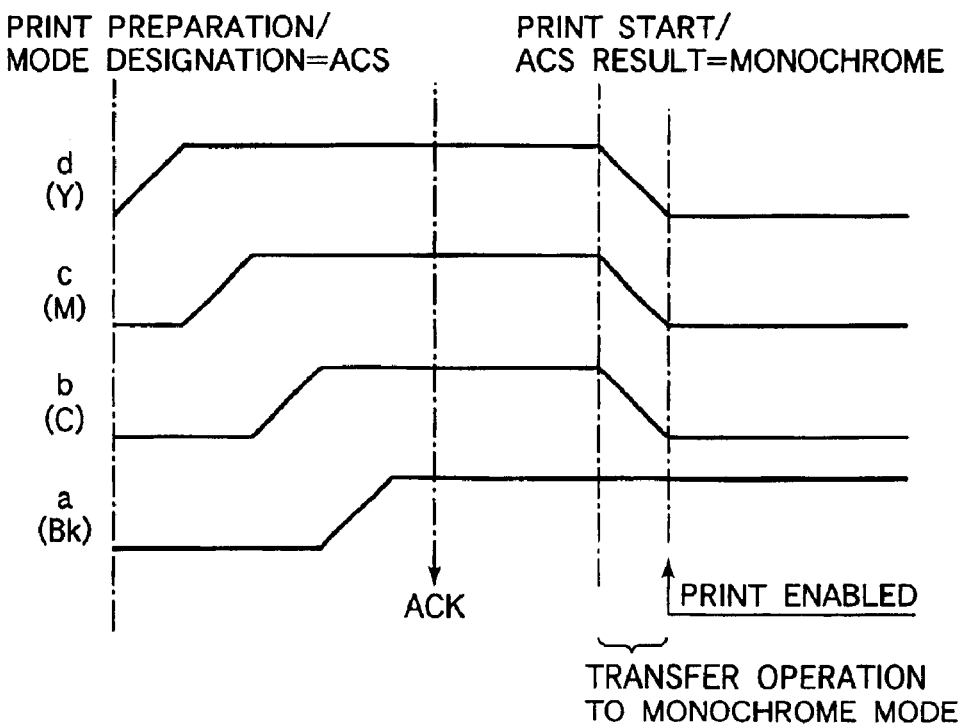
FIG. 10 is a timing chart showing the operation timings when the result of the auto color discrimination is a monochrome mode.

Further, if the color mode is the full-color mode and if the result of the ACS discrimination is judged to be monochrome, as shown in the timing chart in FIG. 10, the preparatory operation is again performed at a timing just when the printer control portion 1000 is notified of the monochrome mode as an ACS result, and, after this re-preparing operation, it comes to the print enabled state. Note that the re-preparing operation (a shift operation to the monochrome mode) in this case can be ended in a short time.

With those processes described above, even in the case of auto color select (ACS) function, a time (a first print out time (FPOT)) up to a completion of the first print operation can be reduced.

It is also possible to decrease a difference between FPOT in the case of utilizing the auto color discriminating function and FPOT in the case of manually setting the full-color/monochrome mode through the operation portion 3500 by the user.

[Second Embodiment]

The embodiment discussed above has exemplified the configuration in which if the set color mode is the ACS mode, the preparatory operation in the full-color mode is made. There may, however, be configured such that when the ACS mode is set as a color mode, the color modes (which are basic color modes of the printer) for which the printer makes the preparatory operation may be the monochrome mode. An embodiment thereof will hereinafter be discussed.

Figure 11:
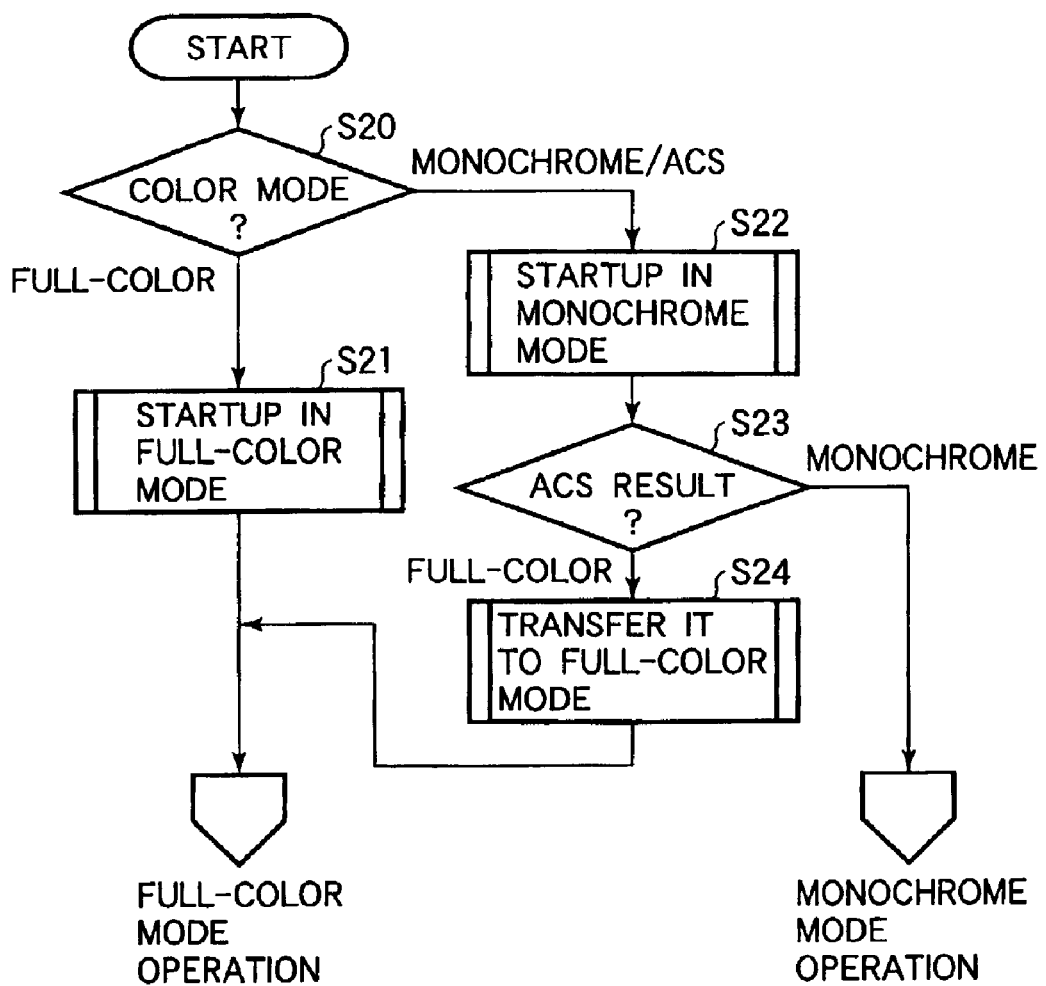
FIG. 11 is a flowchart showing one example of a second control processing procedure.

FIG. 11 is a flowchart showing one example of a second control processing procedure in the image recording apparatus of the present invention. This example shows an operation of the printer control portion 1000 in the case of performing the communications in the procedure shown in FIG. 7, in which the ACS mode is set as the color mode, and the printer is in a standby status in the monochrome mode. That is, the basic color mode of the ACS is set to be the monochrome mode. Note that processes in the flowchart are to be executed by the CPU 1100 shown in FIG. 2 on the basis of the program stored on the ROM 1200. Further, symbols S20 through S24 denote respective steps.

Figure 12:
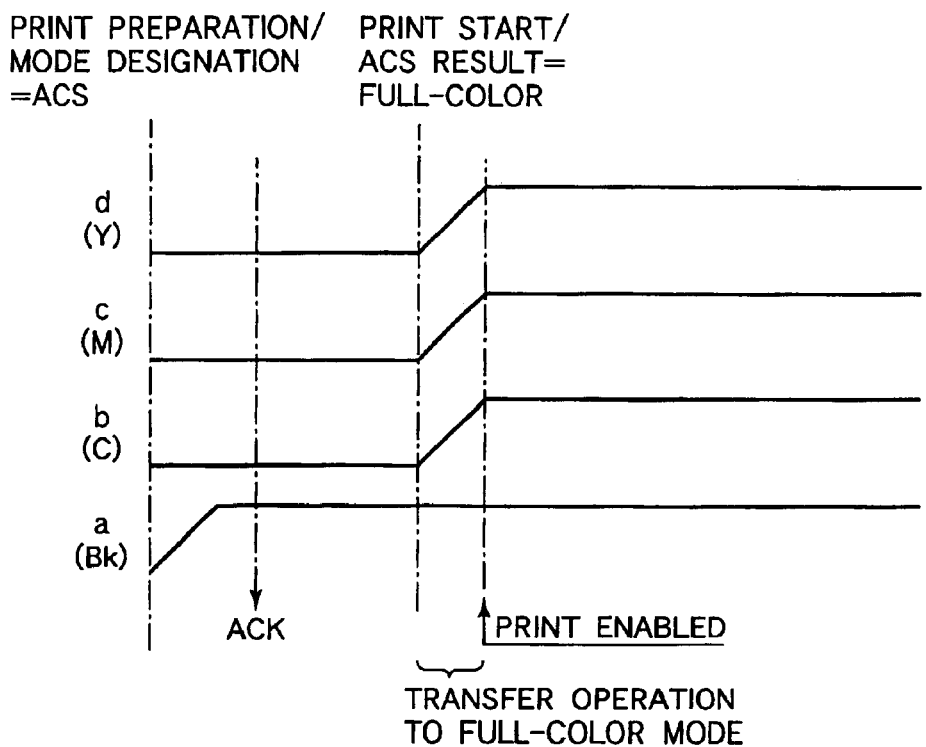
FIG. 12 is a timing chart showing the operation timings when the result of the auto color discrimination is the full-color mode.

At first, the image control portion 3000, when the color mode setting (f1 in FIG. 7) is done, judges which mode, the monochrome mode, the ACS mode, or the full-color mode, this color mode comes under (step S20). If the color mode is judged to be the full-color mode in step S20, the preparatory operation in the full-color mode is made based on the print preparation notification (f3 in FIG. 7) given from the image control portion 3000 (step S21), and the operation in the full-color mode is conducted in response to the print start notification (f5 in FIG. 7) given from the image control portion 3000. FIG. 12 shows a timing chart in this case as will be explained later on.

Figure 13:
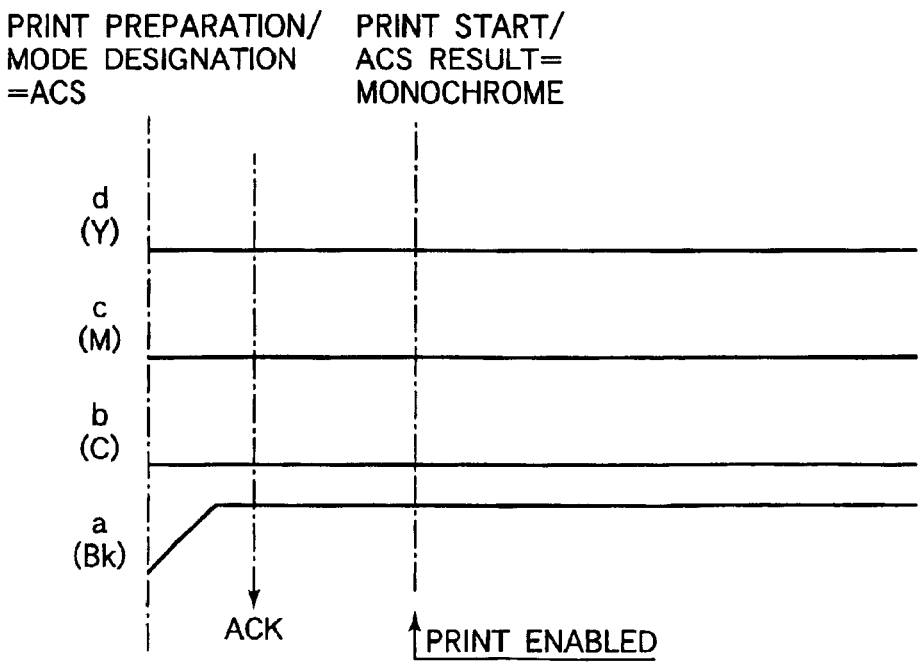
FIG. 13 is a timing chart showing the operation timings when the result of the auto color discrimination is the monochrome mode.

On the other hand, it judging in step S20 that the color mode is the monochrome mode or the ACS mode, the preparatory operation in the monochrome mode is made based on the print preparation notification (f3) given from the image control portion 3000 (step S22). Based on the print start notification (f5) given from the image control portion 3000, an ACS result is received and then judged (step S23). If the ACS result indicates the monochrome mode, the operation in the monochrome mode is performed in its as-is state, and, if the ACS result is the full-color mode the shift operation to the full-color mode is effected (step S24), in which an image forming operation in the full-color mode is carried out. FIG. 12 shows an example in which the ACS result is the full-color mode. FIG. 13 shows an example where the ACS result is the monochrome mode.

Referring to FIG. 12, the ACS result is the full-color mode, and hence it comes to the print enabled state just when the shift operation to the full-color mode is completed.

Referring to FIG. 13, the ACS result is the monochrome mode, and therefore it comes to the print enabled state immediately when the print start notification (f5) is given.

Figure 17:
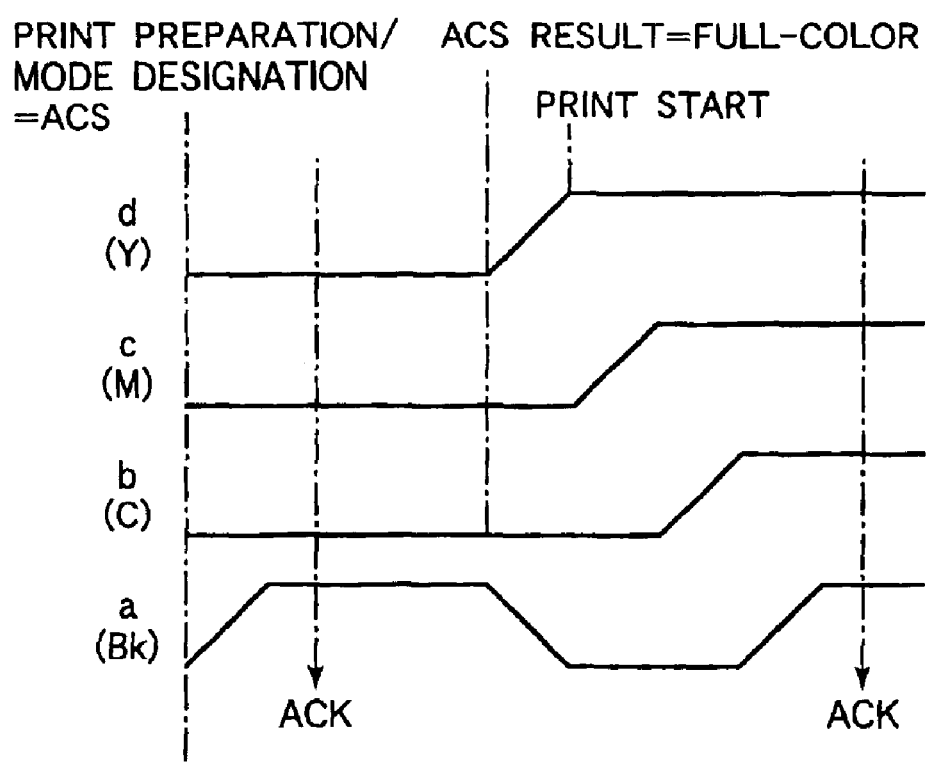
FIG. 17 is a timing chart showing the operation timings when the result of the auto color discrimination is the full-color mode.
Figure 18:
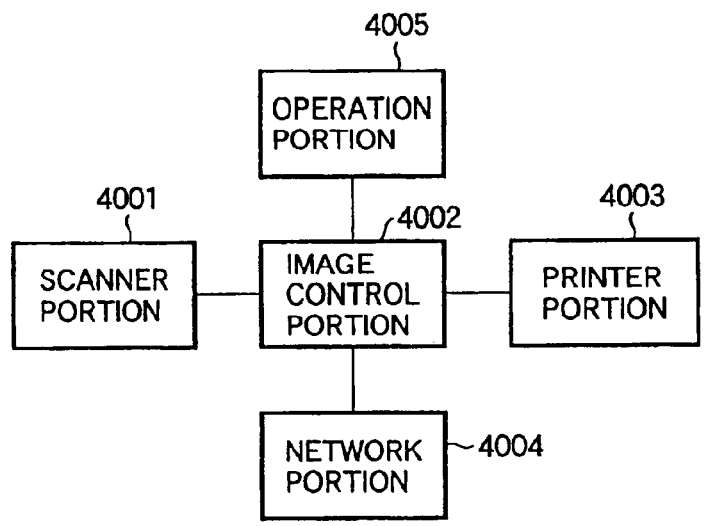
FIG. 18 is a block diagram showing a typical configuration of the color image recording apparatus.

Note that the image forming portion for black remains started up in the example in FIG. 12, however, it is not that the black image is immediately formed but that the black image is formed after forming the images of yellow (Y), magenta (M), and cyan (C). Therefore, when the ACS result is judged to be the full-color mode, the image forming portion for black is temporarily stopped, and thereafter, as shown in FIG. 9, the respective image forming portions may be started up in their operations in the sequence of Y, M, C, and Bk. FIG. 17 shows a timing chart in this case.

With the operation described above, even when the ACS result is the full-color mode, the image forming portion for black does not remain started up in its operation, and hence a lifetime of the image forming portion for black can be elongated.

[Third Embodiment]

The first embodiment discussed above has exemplified the configuration in which if the set color mode is the ACS mode, the preparatory operation in the full-color mode is made, and print operation is performed in the full-color mode in accordance with the print start notification (f5). There may, however, be configured such that when the ACS mode is set as a color mode, the color modes (which are basic color modes of the printer) for which the printer makes the preparatory operation may be preset. An embodiment thereof will hereinafter be discussed.

Figure 14:
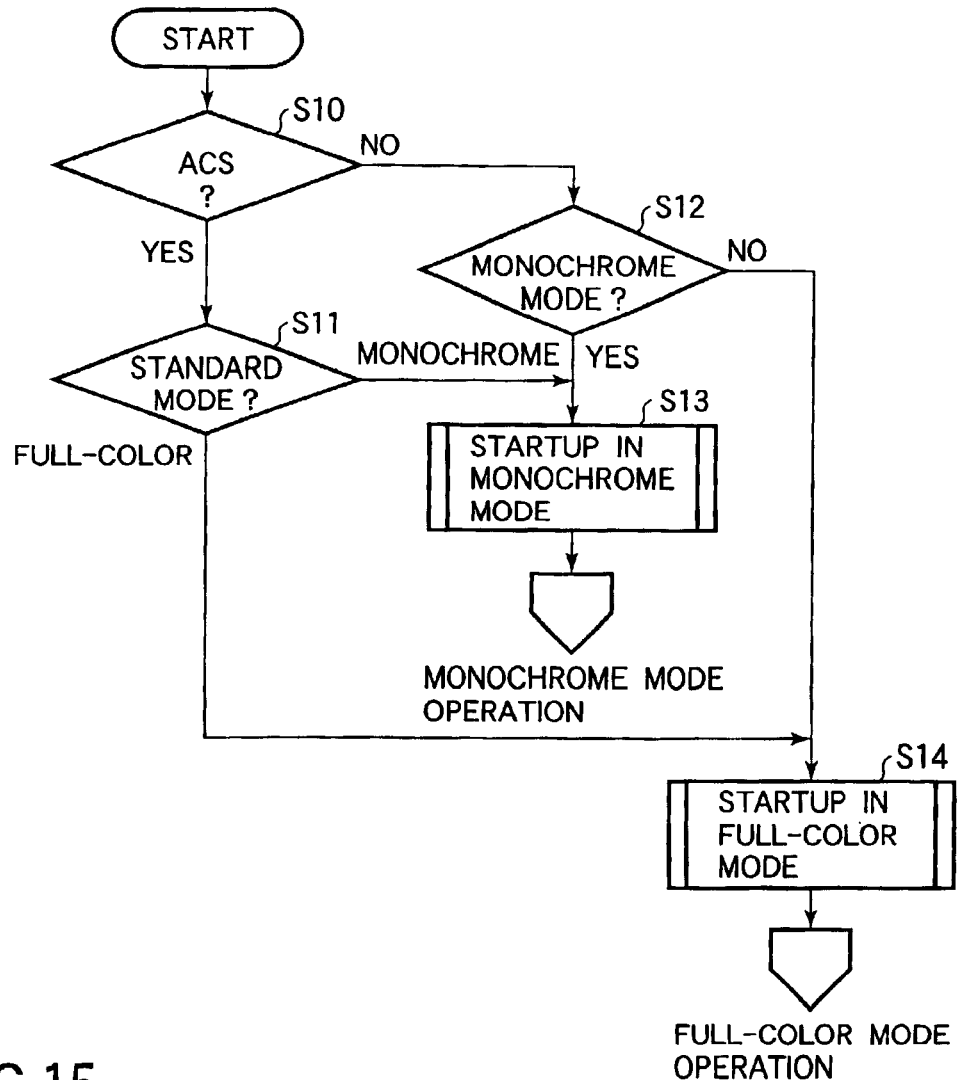
FIG. 14 is a flowchart showing one example of a third control processing procedure.

FIG. 14 is a flowchart showing one example of a third control processing procedure in the image recording apparatus of the present invention. This example shows an operation of the printer control portion 1000 in the case of performing the communications in the procedure shown in FIG. 7, in which the ACS mode is set as the color mode, and the printer is in a standby status in the preset color mode. Note that processes in the flowchart are to be executed by the CPU 1100 shown in FIG. 2 on the basis of the program stored on the ROM 1200. Further, symbols S10 through S14 denote respective steps.

At first, the image control portion 3000, when the color mode setting (f1) is done, judges whether this color mode comes under the ACS mode or not (step S10). If the color mode is judged not to be the ACS mode in step S10, it is judged whether the color mode comes under the monochrome mode or not (step S12).

If the color mode is judged to be the monochrome mode in step S12, the preparatory operation in the monochrome mode is effected in response to the print preparation notification (f3) given from the image control portion 3000 (step S13), and the image is formed in the monochrome mode in response to the print start notification (f5) sent from the image control portion 3000.

On the other hand, if it is judged in step S12 that the color mode is the full-color mode, the preparatory operation in the full-color mode is made in response to the print preparation notification (f3) given from the image control portion 3000 (step S14). In response to the print start notification (f5) given from the image control portion 3000, an image forming operation in the full-color mode is carried out.

On the other hand, if the color mode is judged to be the ACS mode in step S10, it is judged whether the preset basic color mode of the printer is the full-color mode or the monochrome mode (step S11). If the present basic color mode is judged to be the monochrome mode in step S11, the processing proceeds to step S13, in which the preparatory operation in the monochrome mode is conducted in response to the print preparation notification (f3) given from the image control portion 3000, and the image is formed in the monochrome mode in response to the print start notification (f5) given from the image control portion 3000.

On the other hand, if it is judged in step S11 that the preset basic color mode is the full-color mode, the processing proceeds to step S14, in which the preparatory operation in the full-color mode is made in response to the print preparation notification (f3) given from the image control portion 3000. In response to the print start notification (f5) given from the image control portion 3000, an image forming operation in the full-color mode is carried out.

Note that if the full-color mode is set as the basic color mode, similarly to FIG. 8 in the first embodiment, the system operates in the full-color mode during the operation in the ACS mode. However, even if the result of the ACS discrimination is judged to be the monochrome, the operation starts in the full-color mode. In this case, the image control portion 3000 is to output, based on the result of discriminating between the colors, the print image to the printer portion by controlling the image processing of the image processing portion 3600 such that an image density of each of the color components (yellow (Y), magenta (M), and cyan(C)) other than black (Bk) is set to "0" (that is a value indicating non-recording by the printer portion, i.e., a density indicating non-formation of the electrostatic latent image on the drum).

Further, if the monochrome mode is set as the basic color mode, the system operates in the monochrome mode during the operation in the ACS mode. There may, however, be configured so that if the result of the ACS discrimination is judged to be the full-color mode, the operation restarts from the re-preparation again in the full-color mode, or so that the user is prompted to select "Operate in the monochrome mode as it is" or "Make a re-preparation in the color mode".

For example, in the case of the user utilizing the monochrome image formation at a frequency that is by far higher than forming the images in the full colors, FPOT in the monochrome mode can be normally further reduced by setting the monochrome mode as the basic color mode. Even if setting mistakenly the ACS mode in the case of forming the images in the full colors and restarting from the preparation in the full-color mode, this is a quite rare case, and it is therefore convenient to the user to reduce FPOT in the monochrome mode exhibiting an extremely high use frequency.

Moreover, there may be configured so that when prompting the user to select "Operate in the monochrome mode as it is" or "Make a re-preparation in the color mode", this selection is made from on the operation portion 3500 in the case of the print process for the original read through the scanner portion and made from on a computer, etc. in the case of the print process for the data received from the computer, etc. via the network 4000, etc.

With those processes described above, even in the case of auto color discriminating function, FPOT can be reduced.

It is also possible to decrease a difference between FPOT in the case of utilizing the auto color select function and FPOT in the case of manually setting the full-color/monochrome mode through the operation portion 3500 by the user.

Figure 15:
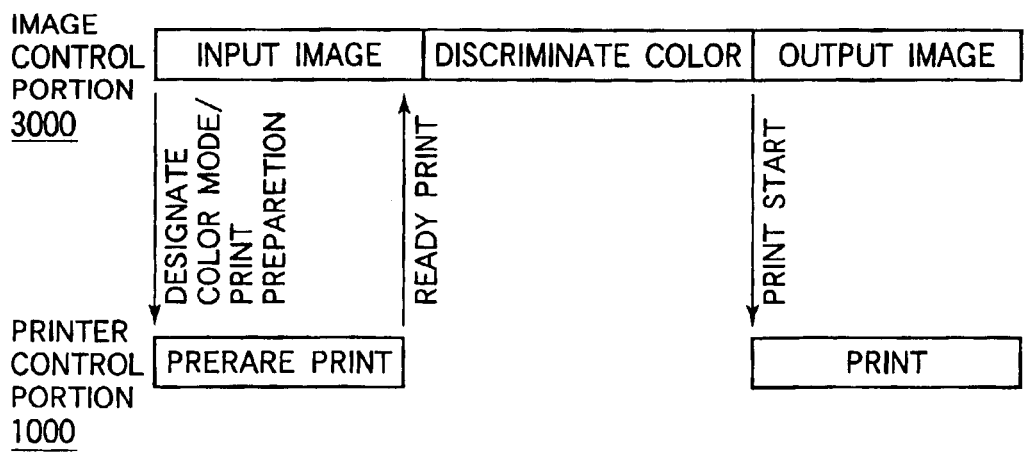
FIG. 15 is a diagram showing an outline of an image forming operation procedure in the case of utilizing an auto color discriminating function.

Referring to FIG. 15, there will hereinafter be explained an outline of the operation procedure of the image formation in the case of utilizing the auto color discriminating function in the image recording apparatus of the present invention.

FIG. 15 is a diagram showing an outline of the operation procedure of the image formation in the case of utilizing the auto color discriminating function in the image recording apparatus of the present invention.

As shown in FIG. 15, first, the image control portion 3000 inputs the image from the scanner control portion 2000, and outputs signals for giving instructions of a color mode designation and the print preparation to the printer control portion 1000.

Next, the printer control portion 1000, upon receiving the print preparation instruction from the image control portion 3000, as shown in the flowcharts in FIGS. 8 and 14, executes the print preparatory operation and outputs, when the print preparation is completed, a signal showing the completion of the print preparation to the image control portion 3000.

Moreover, the image control portion 3000 executes inputting the image and discriminating between the colors (the color discrimination) and, upon receiving the print preparation complete notification from the printer control portion 1000, outputs a signal for giving an instruction of starting the print to the printer control portion 1000 and outputs a print object image in accordance with the predetermined procedure.

The printer control portion 1000, when receiving the print start notification, outputs the print image outputted from the image control portion 3000.

Figure 19:
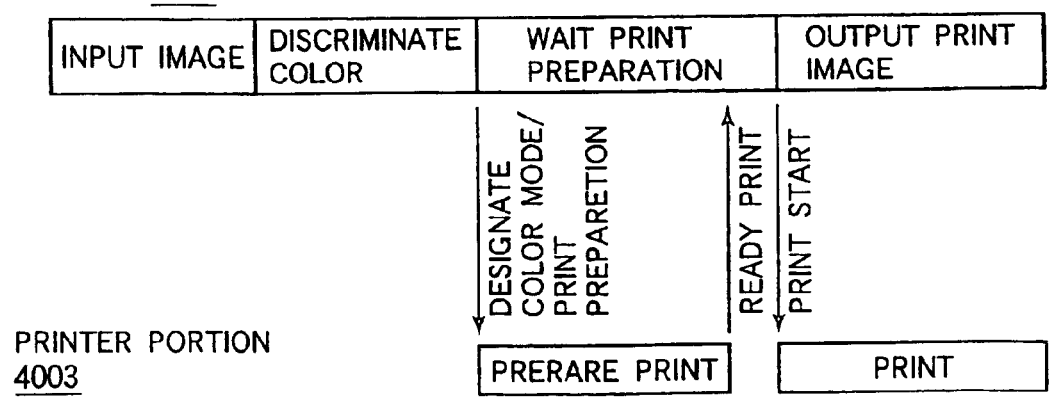
FIG. 19 is a diagram showing an outline of a conventional image forming operation procedure using the auto color discriminating function.
Figure 20:
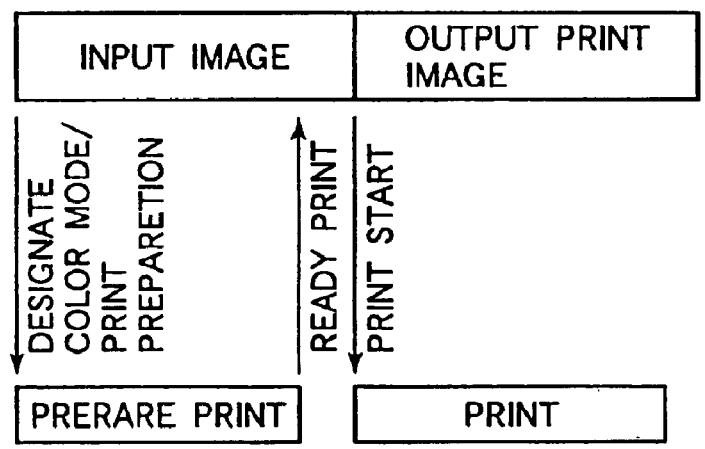
FIG. 20 is a diagram showing an outline of the conventional image forming operation procedure without using the auto color discriminating function.

Thus, according to the image forming operation procedure (FIG. 15) in the third embodiment, FPOT can be made shorter as compared with the conventional image forming operation procedure shown in FIG. 19.

Further, it is possible to decrease the difference between FPOT in the case of utilizing the auto color discriminating function and FPOT in the case of manually setting the full-color/monochrome mode through the operation portion 3500 by the user. It is also feasible to get rid of an irritating feeling of the user that is caused by the difference between FPOTs in the case of utilizing the ACS and in the case of setting the color mode.

Note that each of the embodiments discussed above has exemplified the case in which the printer portion is of the laser beam system, however, the present invention can be applied to electrophotographic systems (an LED system, for instance) other than the laser beam system and to whatever recording systems on condition that the preparatory operation in the monochrome mode is different from the preparatory operation in the full-color mode.

Moreover, the present invention embraces configurations in which the respective embodiments are combined with each other.

As discussed above, even when the output preparatory operation and the output operation of the printer portion differ depending on the color mode, the printer portion is notified of utilizing the ACS and, upon receiving this notification, starts the print preparatory operation in the preset color mode (the full-color mode, for example) before the ACS discrimination result comes out. Even if the ACS result is the monochrome mode, the monochrome image is outputted in the full-color mode (so as to prevent the color components of Y, M, and C from being developed in this case. Then, in the color printer, FPOT when in the ACS mode is reduced, and the difference from when setting the color mode (the color/monochrome mode) can be also decreased.

A structure of a data processing program readable by the recording apparatus of the present invention, will hereinafter be explained with reference to a memory map shown in FIG. 16.

Figure 16:
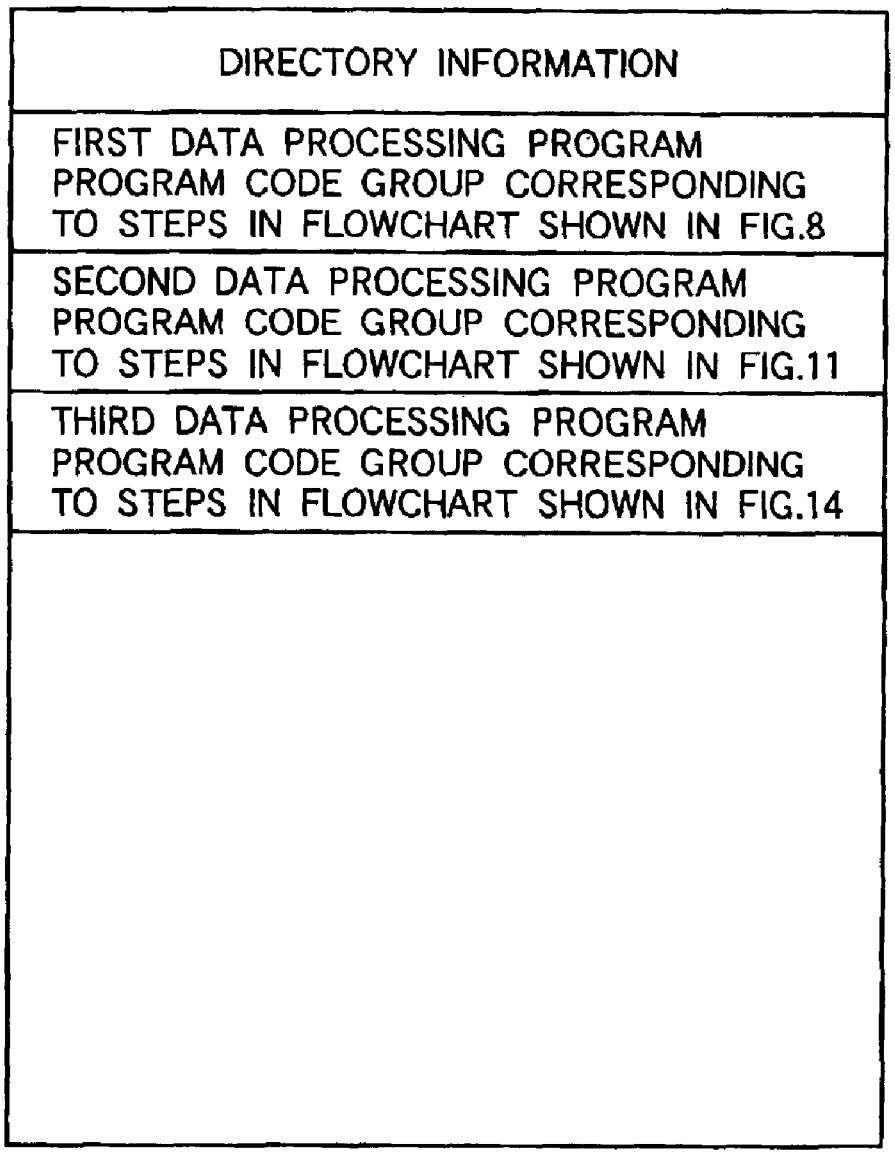
FIG. 16 is an explanatory schematic diagram showing a memory map on a storage medium stored with a variety of data processing programs readable by the color image recording apparatus.

FIG. 16 is an explanatory schematic diagram of the memory map on a storage medium for storing a variety of data processing programs readable by the recording apparatus of the present invention. Note that this memory map may be segmented on a plurality of storage mediums.

Incidentally, though not particularly illustrated, there might be a case of storing pieces of information such as version information, a creator information, etc. for managing a program suite (group) stored on the storage medium and pieces of information such as icons for identically representing the programs, which depend on OS, etc. on the program reading side.

Further, data subordinate to the variety of programs are managed in the directories described above. Furthermore, there might be a case of storing a program for, if the program to be installed and the data are compressed, extracting them, and so on.

The functions shown in FIGS. 8, 11, and 14 in the third embodiment may be actualized in such a way that a host computer executes the programs installed from outside. Then, the present invention is applied also to a case in which the information group containing the programs is supplied to the output device from the storage medium such as a CD-ROM, a flash memory, an FD, etc., or from an external storage medium via the network.

As described above, the object of the present invention is, as a matter of course, accomplished in the way that the system or the apparatus is provided with the storage medium recorded with the software program codes for actualizing the functions in the embodiments discussed above, and the computer (the CPU or the MPU) of the system or the apparatus reads and executes the program codes stored on the storage medium.

In this case, it follows that the program codes themselves read from the storage medium actualize novel functions of the present invention, and the storage medium stored with the program codes configure the present invention.

Mediums usable as the storage medium for supplying the program codes are, for example, a floppy (a registered trademark) disk, a hard disk, optical disk, a magneto-optic disk, a CD-ROM, a CD-R, a DVD-ROM, a magnetic tape, a nonvolatile memory card, a ROM, an EEPROM, a silicon disk and so forth.

Moreover, the present invention, of course, includes a case where the computer executes the readout program codes, and the functions in the embodiments discussed above are thereby actualized, and a case where OS (Operating System), etc. running on the computer executes a part or the whole of actual processes on the basis of the instructions of the program codes, thereby actualizing the functions in the embodiment discussed above.

Furthermore, the present invention of course includes a case where the program codes read from the storage medium are stored on the memory provided in a function extended board inserted into the computer or in a function extended unit connected to the computer, and thereafter the CPU, etc. provided in the function extended board or in the function extended unit executes a part or the whole of actual processes on the basis of the instructions of the program codes, thereby actualizing the functions in the embodiments described above.

The present invention may also be applied to a system configured by a plurality of devices and to an apparatus constructed of one single device. Further, the present invention can be, as a matter of course, applied to a case in which the present invention is attained by supplying the programs to the system or the apparatus. In this case, the programs described softwarewise for attaining the present invention are stored on the storage medium and are read into the system or the apparatus, whereby the system or the apparatus can enjoy the effects of the present invention.

Further, the programs described softwarewise for attaining the present invention are downloaded from the database on the network through a communication program and are read into the system or the apparatus, whereby the system or the apparatus can enjoy the effects of the present invention.

What is claimed is:

1. A color image forming apparatus comprising:
an image input portion arranged to input image data;
an image forming portion arranged to be provided for every recording color component and to form an image based on the image data inputted by the image input portion;
a recording mode setting portion arranged to set whether an auto color discriminating function is used or not;
a discriminating portion arranged to discriminate, if the use of the auto color discriminating function is selected, whether the image inputted by the image input portion is a color image or a monochrome image by analyzing the image data;
a preparatory operation control portion arranged to cause the image forming portion to make a preparatory operation in a full-color recording mode before obtaining a result of the discrimination by the discriminating portion; and
an image forming control portion arranged to cause, if the discriminating portion judges that the input image is the monochrome image, the image formation to be executed by a shift from the full-color recording mode to a monochrome recording mode and to cause, if the input image is judged to be the color image, the image formation to be executed in the full-color recording mode.

2. A color image forming apparatus according to claim 1, wherein the image forming control portion, if the input image is judged to be the monochrome image, shifts the recording mode to the monochrome recording mode by stopping operations of the image forming portions for recording color components excluding black.

3. A color image forming apparatus comprising:
   an image input portion arranged to input image data;
   an image forming portion arranged to be provided for every recording color component and to form an image based on the image data inputted by the image input portion;
   a recording mode setting portion arranged to set whether an auto color discriminating function is used or not;
   a discriminating portion arranged to discriminate, if the use of the auto color discriminating function is selected, whether the image inputted by the image input portion is a color image or a monochrome image by analyzing the image data;
   a preparatory operation control portion arranged to cause the image forming portion to make a preparatory operation in a monochrome recording mode before obtaining a result of the discrimination by the discriminating portion; and
   an image forming control portion arranged to cause, if the discriminating portion judges that the input image is the monochrome image, the image formation to be executed in the monochrome recording mode and to cause, if the input image is judged to be the color image, the image formation to be executed in a full-color recording mode by a shift from the monochrome recording mode to the full-color recording mode.

4. A color image forming apparatus according to claim 3, wherein the image forming control portion, if the input image is judged to be the color image, causes the image forming portions for the recording color components to operate sequentially after once stopping the operation of the image forming portion for black.

5. A color image forming apparatus according to claim 3, wherein the image forming control portion, if the input image is judged to be the color image, causes the image forming portions for the recording color components excluding black to operate while keeping the operation of the image forming portion for black.

6. A control method of a color image forming apparatus, comprising:
   an image input step for inputting image data;
   an image forming step for forming an image on the basis of the image data inputted in the image input step by an image forming portion provided for every recording color component;
   a recording mode setting step for setting whether an auto color discriminating function is used or not;
   a discriminating step for discriminating, if the use of the auto color discriminating function is selected, whether the image inputted in the image input step is a color image or a monochrome image by analyzing the image data;
   a preparatory operation control step for causing the image forming portion to make a preparatory operation in a full-color recording mode before obtaining a result of the discrimination in the discriminating step; and
   an image forming control step for causing, if it is judged in the discriminating step that the input image is the monochrome image, the image formation to be executed by a shift from the full-color recording mode to a monochrome recording mode and for causing, if the input image is judged to be the color image, the image formation to be executed in the full-color recording mode.

7. A control method according to claim 6, wherein in the image forming control step, if the input image is judged to be the monochrome image, the recording mode is shifted to the monochrome recording mode by stopping operations of the image forming portions for recording color components excluding black.

8. A control method of a color image forming apparatus, comprising:
   an image input step for inputting image data;
   an image forming step for forming an image on the basis of the image data inputted in the image input step by an image forming portion provided for every recording color component;
   a recording mode setting step for setting whether an auto color discriminating function is used or not;
   a discriminating step for discriminating, if the use of the auto color discriminating function is selected, whether the image inputted in the image input step is a color image or a monochrome image by analyzing the image data;
   a preparatory operation control step for causing the image forming portion to make a preparatory operation in a monochrome recording mode before obtaining a result of the discrimination in the discriminating step; and
   an image forming control step for causing, if it is judged in the discriminating step that the input image is the monochrome image, the image formation to be executed in the monochrome recording mode and for causing, if the input image is judged to be the color image, the image formation to be executed in a full-color recording mode by a shift from the monochrome recording mode to the full-color recording mode.

9. A control method according to claim 8, wherein the image forming control step involves, if the input image is judged to be the color image, causing the image forming portions for the recording color components to operate sequentially after once stopping the operation of the image forming portion for black.

10. A control method according to claim 8, wherein the image forming control step involves, if the input image is judged to be the color image, causing the image forming portions for the recording color components excluding black to operate while keeping the operation of the image forming portion for black.

11. A color image forming apparatus comprising:
    a scanner control portion arranged to control an input of image data;
    an image control portion arranged to cause the image data from the scanner control portion to undergo image processing for printing; and
    a printer control portion arranged to control an image forming operation based on the image data processed by the image control portion, wherein:
    the image control portion includes:
    a recording mode setting portion arranged to judge whether the use of an auto color discriminating function is set or not, and to notify the printer control portion of a result of the judgment; and
    a discriminating portion arranged to discriminate, if the use of the auto color discriminating function is selected, whether the inputted image is a color image or a monochrome image by analyzing the image data, and to notify the printer control portion of a result of the discrimination; and the print control portion includes:

a first control portion arranged to execute a preparatory operation of forming the image in a monochrome recording mode before obtaining the result of the discrimination by the discriminating portion; and a second control portion arranged to execute, if the discriminating portion judges that the input image is the monochrome image, forming the image in the monochrome recording mode, and to execute, if the input image is judged to be the color image, forming the image in a full-color recording mode after a shift from the monochrome recording mode to the full-color recording mode.

12. A color image forming apparatus comprising:

a scanner control portion arranged to control an input of image data;

an image control portion arranged to cause the image data from the scanner control portion to undergo image processing for printing; and a printer control portion arranged to control an image forming operation based on the image data processed by the image control portion, wherein:

the image control portion includes:

a recording mode setting portion arranged to judge whether the use of an auto color discriminating function is set or not, and to notify the printer control portion of a result of the judgment; and a discriminating portion arranged to discriminate, if the use of the auto color discriminating function is selected, whether the inputted image is a color image or a monochrome image by analyzing the image data, and to notify the printer control portion of a result of the discrimination; and the print control portion includes:

a first control portion arranged to execute a preparatory operation of forming the image in a full-color recording mode before obtaining the result of the discrimination by the discriminating portion; and a second control portion arranged to execute, if the discriminating portion judges that the input image is the color image, forming the image in the full-color recording mode, and to execute, if the input image is judged to be the monochrome image, forming the image in a monochrome recording mode after a shift from the full-color recording mode to the monochrome recording mode.

13. A control method of a color image forming apparatus, the color image forming apparatus including:

a scanner control portion arranged to control an input of image data;

an image control portion arranged to cause the image data from the scanner control portion to undergo image processing for printing; and a printer control portion arranged to control an image forming operation based on the image data processed by the image control portion, said control method comprising:

a step of causing the image control portion to execute a method comprising:

a recording mode setting step for judging whether the use of an auto color discriminating function is set or not, and for notifying the printer control portion of a result of the judgment; and a discriminating step for discriminating, if the use of the auto color discriminating function is selected, whether the inputted image is a color image or a monochrome image by analyzing the image data, and for notifying the printer control portion of a result of the discrimination; and a step of causing the print control portion to execute a method comprising:

a first control step for executing a preparatory operation of forming the image in a monochrome recording mode before obtaining the result of the discrimination in the discriminating step; and a second control step for executing, if judging in the discriminating step that the input image is the monochrome image, forming the image in the monochrome recording mode, and for executing, if the input image is judged to be the color image, forming the image in a full-color recording mode after a shift from the monochrome recording mode to the full-color recording mode.

14. A control method of a color image forming apparatus, the color image forming apparatus including:

a scanner control portion arranged to control an input of image data;

an image control portion arranged to cause the image data from the scanner control portion to undergo image processing for printing; and a printer control portion arranged to control an image forming operation based on the image data processed by the image control portion, said control method comprising:

a step of causing the image control portion to execute a method comprising:

a recording mode setting step for judging whether the use of an auto color discriminating function is set or not, and for notifying the printer control portion of a result of the judgment; and a discriminating step for discriminating, if the use of the auto color discriminating function is selected, whether the inputted image is a color image or a monochrome image by analyzing the image data, and for notifying the printer control portion of a result of the discrimination; and a step of causing the print control portion to execute a method comprising:

a first control step for executing a preparatory operation of forming the image in a full-color recording mode before obtaining the result of the discrimination in the discriminating step; and a second control step for executing, if judging in the discriminating step that the input image is the color image, forming the image in the full-color recording mode, and for executing, if the input image is judged to be the monochrome image, forming the image in a monochrome recording mode after a shift from the full-color recording mode to the monochrome recording mode.

* * * * *